United States Patent [19]

Wagner

[11] Patent Number: 5,362,195
[45] Date of Patent: Nov. 8, 1994

[54] TILTING TRAILER FOR A MOTORCYCLE

[76] Inventor: Michael D. Wagner, 911 Jade Cir., Placentia, Calif. 92670

[21] Appl. No.: 169,415

[22] Filed: Dec. 20, 1993

[51] Int. Cl.$^5$ .............................................. B60P 3/06
[52] U.S. Cl. ..................................... 414/483; 280/789
[58] Field of Search ............... 414/480, 537, 482–485; 280/638, 656, 789

[56] References Cited

U.S. PATENT DOCUMENTS

| | | | |
|---|---|---|---|
| 2,860,800 | 11/1958 | Wilson et al. | 414/482 |
| 3,455,474 | 7/1969 | Truncali | 414/485 |
| 3,625,545 | 12/1971 | Somers et al. | 280/789 X |
| 4,032,167 | 6/1977 | Chereda | 414/537 X |
| 4,490,089 | 12/1984 | Welker | 280/656 X |
| 4,813,841 | 3/1989 | Eischer | 414/485 X |
| 4,932,829 | 6/1990 | Miller | 414/537 X |
| 4,968,210 | 11/1990 | Friederich | 414/485 |
| 5,051,053 | 9/1991 | Groeneweg | 414/484 X |
| 5,059,085 | 10/1991 | Koller | 414/482 |
| 5,234,307 | 8/1993 | Scott | 414/482 X |

FOREIGN PATENT DOCUMENTS

9311023  6/1993  WIPO ................................. 280/789

*Primary Examiner*—David A. Bucci
*Attorney, Agent, or Firm*—Edgar W. Averill, Jr.

[57] ABSTRACT

A trailer to be towed behind a motor vehicle for transporting a motorcycle. The trailer has a frame with a U-shaped opening in the rear which supports a tilting frame which is hinged to the middle of the trailer. A long guide rail is held on a floor supported by the tilting frame. This permits the user to ride a motorcycle up the tilting trailer floor until it passes the center of gravity at which time the tilting floor and guide rail tilt forward so that the floor and guide rail are horizontal with the trailer floor.

3 Claims, 1 Drawing Sheet 5,362,195

TILTING TRAILER FOR A MOTORCYCLE

BACKGROUND OF THE INVENTION

The field of the invention is trailers and the invention relates more particularly to lightweight trailers for transporting motorcycles. Motorcycle riding has become increasingly popular. In order to reach desired areas in which to ride, it is often necessary to ride the motorcycle through traffic and uncomfortable temperatures to reach the desirable area in which to ride. Such uncomfortable driving can be done more comfortably in an air conditioned automobile. Thus, it is beneficial to tow the motorcycle on a trailer until the desired riding area is reached. It is also occasionally necessary to retrieve a motorcycle that may need mechanical work and a trailer for this purpose is also needed. Trailers have been provided with a hinged ramp such as that shown in U.S. Pat. No. 4,032,167, but the ramps do not have a floor next to them so that there is a substantial hazard as the user rides up the ramp to the floor of the trailer. Ramps of the type shown in U.S. Pat. No. 4,032,167, and particularly FIG. 6 thereof, present a problem with contacting the frame or exhaust pipes of a motorcycle as the motorcycle passes over this angle between the ramp and the floor of the trailer. Trailers with tilting floors have been used for many years and two patents showing such trailers are U.S. Pat. Nos. 4,813,841 and 5,016,896.

SUMMARY OF THE INVENTION

It is an object of the present invention to provide a trailer for transporting a motorcycle which permits the motorcycle to driven or pushed up a guide rail without the possibility of bottoming out the motorcycle as it is being moved onto the trailer.

The present invention is for a trailer to be towed behind a motor vehicle. The trailer has a frame supported by at least two wheels and having a tongue and trailer hitch extending from the front thereof. Right and left trailer floors are supported by the trailer frame along the right and left sides of the frame. A tiltable trailer floor is positioned partly on a frame hingedly supported by the trailer frame and the frame also holds an elongated guide rail which extends beyond the floor which is supported by the tiltable trailer frame. The forward portion of the floor is supported by the elongated guide rail which permits the motorcycle rider to have a floor adjacent the entire length of the guide rail as the motorcycle is ridden or pushed up the guide rail and past its point of hinging with the trailer frame. The floor and guide rail then tilt forward so that they are coplanar with the trailer floor. A lock is provided to hold the tiltable floor in a horizontal position with safety pins.

DESCRIPTION OF THE PREFERRED EMBODIMENTS

Figure 1:
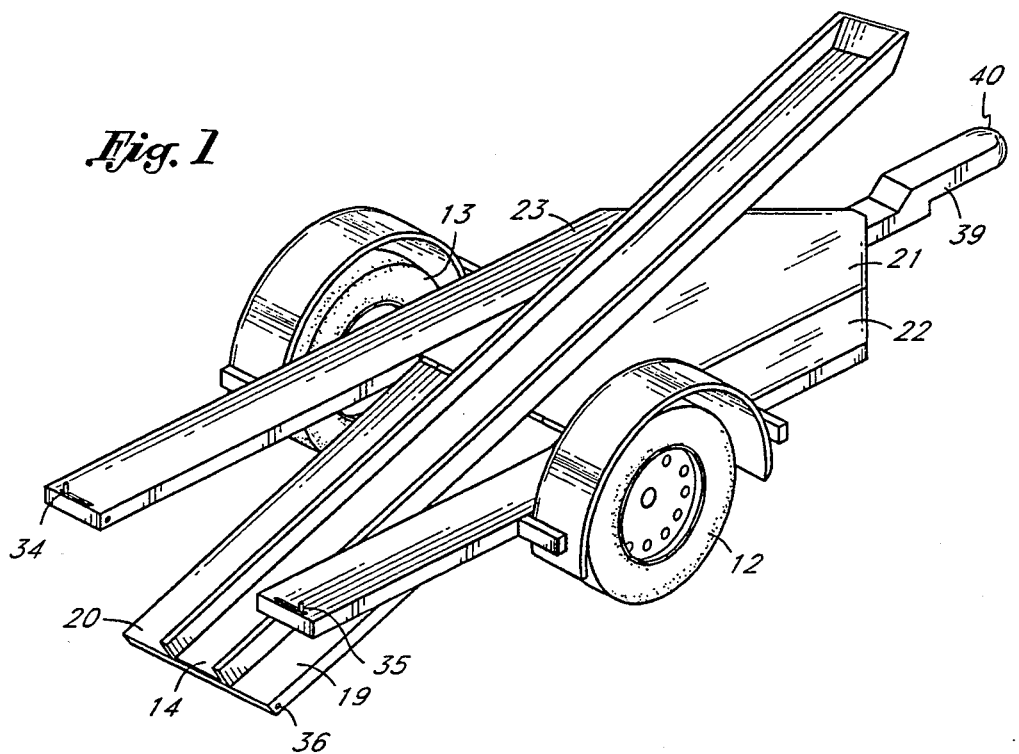
FIG. 1 is a perspective view of the trailer of the present invention.

A tilting trailer for transporting a motorcycle is shown in perspective view in FIG. 1 and indicated generally by reference character 10. Trailer 10 has a frame shown best in FIG. 2 indicated generally by reference character 11 which supports an axle not shown which in turn supports right and left wheels 12 and 13, respectively.

A tilting guide rail 14 is held by a tilting frame. Tilting frame 15 is hingedly held to crossbar 16 at reference characters 17 and 18. A tilting floor 19 is positioned between the guide rail 14 and tilting frame 15. The forward portion of the floor under the forward portion of the guide rail is indicated by reference character 21 and is fixed to frame 11. A right floor portion 22 and a left floor portion 23 are also held by the frame and affixed to the frame as is floor portion 21.

Figure 2:
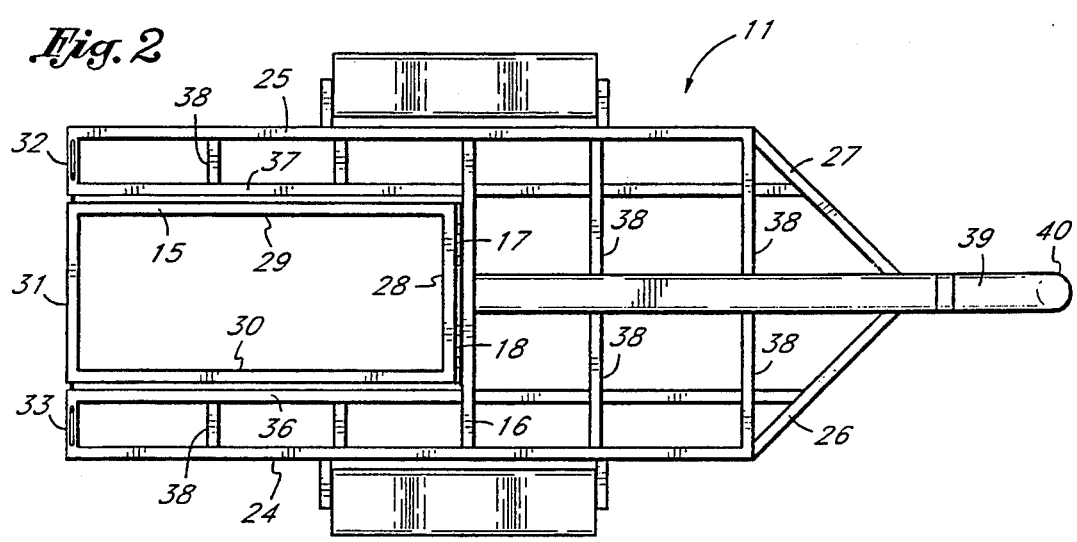
FIG. 2 is a perspective view of the frame of the trailer of FIG. 1.

Frame 11 has a right rail 24, a left rail 25, a right front rail 26 and a left front rail 27. Tilting frame 15 has a front rail 28, side rails 29 and 30 and a rear rail 31. It is hinged to crossbar 16 at locations 17 and 18. It is locked to the rear frame members 32 and 33 when it is in the upright position as shown in FIG. 2. A pair of locking pins are moved inwardly by handles 34 and 35 and fit into holes such as hole 36 shown in FIG. 1 to securely hold the tilting floor 19 in an upright position. Tilting frame 15 is supported in a U-shaped portion of frame 11 which is surrounded by side rails 36 and 37 and crossbar 16. Crossbars 38 complete the frame together with tongue 39 which extends forwardly of the frame and supports trailer hitch 40.

In use locking rods 34 and 35 are opened and the guide rail 14 and tilting floor 19 are pushed downwardly to the position shown in FIG. 1. The trailer is devised so that the guide rail is almost balanced but will stay in the tilting position as shown in FIG. 1. Next as the motorcycle is driven up guide rail 14 the center of gravity moves forward until it is sufficient to guide rail 14 into a horizontal position. The locks 34 and 35 are secured and the motorcycle is tied down using conventional tie down hooks (not shown).

The result is a very easy to use light and attractive trailer which permits the motorcycle rider to transport his motorcycle to a desired riding location in comfort. When the motorcycle is to be removed, lock rods 34 and 35 are unlocked and the motorcycle rolled backwards to cause the guide rail 14 to tilt back into the position shown in FIG. 1.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A trailer to be towed behind a motor vehicle, said trailer comprising:
   a trailer frame having a front, a right side and a left side and a rear, said frame being supported by at least two wheels;
   a tongue held by said frame and extending past the front of the frame and including a trailer hitch at a forward end thereof;
   right and left trailer floors supported by said trailer frame adjacent the right and left sides thereof, said right and left trailer floors being separated in a longitudinal center area of said frame;
   a tiltable trailer floor positioned on a tiltable trailer frame hingedly supported by said trailer frame and said frame and floor being positioned between said right and left trailer floors, said tiltable trailer floor being at least two feet wide having a front, a back, a right side, and a left side, said tiltable trailer frame including hinge means near a center of gravity of the tiltable trailer floor and frame, said tiltable trailer frame and floor being mounted on said frame by said hinge means so that a back of the floor thereof may be tilted downwardly to touch a ground area upon which the trailer rests;

an elongated guide rail supported by said tiltable trailer floor having a center guide area with two sides and an upwardly directed side rail along each side thereof; and means for securing the tiltable trailer floor and frame in a position so that its floor is coplanar with the trailer floors whereby a motorcycle rider may ride a motorcycle up the elongated guide rail from the ground when the tiltable trailer floor is tilted downwardly and may support his motorcycle by placing his feet on the tiltable floor adjacent the elongated guide rail until the forward movement of the motorcycle causes the tiltable floor to tilt forward.

2. The trailer of claim 1 wherein said tiltable trailer floor frame is locked in a horizontal position by a lock positioned at a back of the tiltable trailer frame.

3. The trailer of claim 1 wherein the tiltable trailer floor extends to the front of the tiltable trailer frame.

* * * * *